United States Patent
Kim et al.

(10) Patent No.: US 10,291,662 B2
(45) Date of Patent: May 14, 2019

(54) METHOD FOR OBTAINING OPERATOR NETWORK IDENTIFICATION NUMBER OF VISITED NETWORK

(71) Applicant: LG ELECTRONICS INC., Seoul (KR)

(72) Inventors: Hyunsook Kim, Seoul (KR); Jinsook Ryu, Seoul (KR); Laeyoung Kim, Seoul (KR); Myungjune Youn, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/752,990

(22) PCT Filed: Aug. 12, 2016

(86) PCT No.: PCT/KR2016/008873
§ 371 (c)(1),
(2) Date: Feb. 15, 2018

(87) PCT Pub. No.: WO2017/034195
PCT Pub. Date: Mar. 2, 2017

(65) Prior Publication Data
US 2018/0234469 A1 Aug. 16, 2018

Related U.S. Application Data

(60) Provisional application No. 62/209,886, filed on Aug. 26, 2015.

(51) Int. Cl.
*H04W 8/06* (2009.01)
*H04W 8/10* (2009.01)
(Continued)

(52) U.S. Cl.
CPC ........ *H04L 65/1073* (2013.01); *H04L 65/105* (2013.01); *H04L 65/1016* (2013.01);
(Continued)

(58) Field of Classification Search
CPC .............. H04L 65/1016; H04L 65/105; H04L 65/1073; H04L 65/80; H04L 65/1066;
(Continued)

(56) References Cited

U.S. PATENT DOCUMENTS

2004/0122934 A1* 6/2004 Westman .......... H04L 29/06027
709/223
2004/0184452 A1* 9/2004 Huotari ................... H04L 29/06
370/384

(Continued)

FOREIGN PATENT DOCUMENTS

EP 2658202 A1 10/2013
WO WO 2008/051944 A2 5/2008
(Continued)

OTHER PUBLICATIONS

LG Electronics, "Solution Proposal for Key Issue #3," SA WG2 Meeting #11, S2-153164, Chengdu, P.R. China, Oct. 19-23, 2015, pp. 1-3.

(Continued)

*Primary Examiner* — Nizar N Sivji
(74) *Attorney, Agent, or Firm* — Birch, Stewart, Kolasch & Birch, LLP

(57) ABSTRACT

One disclosure of the present specification provides a method for a proxy-call session control function (P-CSCF) to obtain an identifier of a visited public land mobile network (V-PLMN) in order to register a user equipment (UE) roaming in the V-PLMN into an IP multimedia subsystem (IMS) network. The method may comprise the steps of: receiving a response message from an Interrogating- (Continued)

CSCF (I-CSCF) in response to the transmission of a REGISTER message for registering a user equipment into an IMS network; determining whether the received response message is a 401 unauthorized message; when the received response message is a 401 unauthorized message, transmitting the response message to the user equipment and generating an interface for transmitting and receiving data to and from an entity of an EPC network; and receiving an identifier of the V-PLMN from the entity of the EPC network.

13 Claims, 17 Drawing Sheets

(51) Int. Cl.
*H04W 8/12* (2009.01)
*H04L 29/06* (2006.01)
*H04W 60/00* (2009.01)

(52) U.S. Cl.
CPC .......... *H04L 65/1046* (2013.01); *H04W 8/06* (2013.01); *H04W 8/10* (2013.01); *H04W 8/12* (2013.01); *H04W 60/00* (2013.01); *H04L 65/1006* (2013.01)

(58) Field of Classification Search
CPC ......... H04W 8/04; H04W 8/06; H04W 12/06; H04W 84/042; H04M 1/2535; H04M 15/61; H04M 7/123; H04M 7/127; G08B 25/10
See application file for complete search history.

(56) References Cited

U.S. PATENT DOCUMENTS

| | | | |
|---|---|---|---|
| 2008/0003957 A1* | 1/2008 | Schwagmann | ... H04L 29/12283 455/91 |
| 2008/0039085 A1* | 2/2008 | Phan-Anh | ......... H04L 29/12188 455/435.1 |
| 2010/0087191 A1 | 4/2010 | Kocsis | |
| 2010/0189072 A1* | 7/2010 | Vikberg | ................ H04W 48/18 370/331 |
| 2011/0141947 A1* | 6/2011 | Li | ....................... H04M 3/2281 370/259 |
| 2011/0195710 A1 | 8/2011 | Nas et al. | |
| 2014/0273969 A1 | 9/2014 | Zhang et al. | |
| 2015/0156221 A1* | 6/2015 | Abtin | .................. H04L 65/1016 370/352 |
| 2017/0366954 A1* | 12/2017 | Sabeur | .................... H04W 4/90 |

FOREIGN PATENT DOCUMENTS

| | | |
|---|---|---|
| WO | WO 2008/051944 A3 | 5/2008 |
| WO | WO 2011/047726 A1 | 4/2011 |

OTHER PUBLICATIONS

NTT DOCOMO, "Key Issue: Determination of VPLMN-ID at IMS entities in HPLMN," SA WG2 Meeting #110, S2-152384, Dubrovnik, Croatia, Jul. 6-10, 2015, pp. 1-3.

* cited by examiner

FIG. 8 --PRIOR ART--

METHOD FOR OBTAINING OPERATOR NETWORK IDENTIFICATION NUMBER OF VISITED NETWORK

CROSS REFERENCE TO RELATED APPLICATIONS

This application is the National Phase of PCT International Application No. PCT/KR2016/008873, filed on Aug. 12, 2016, which claims priority under 35 U.S.C. 119(e) to U.S. Provisional Application No. 62/209,886, filed on Aug. 26, 2015, all of which are hereby expressly incorporated by reference into the present application.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |
| Rx | A reference point between PCRF and AF (Application Function), AF can be P-CSCF of IMS nework |

Among the reference points shown in FIG. 1, S2a and S2b correspond to a Non-3GPP interface. S2a is a reference point that provides the user plane with the relevant control and mobility support between trusted Non-3GPP access and PDN GW. S2b is a reference point providing the user plane with the associated control and mobility support between the ePDG and the PDN GW.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular. AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs).

Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 illustrates a connection process in a radio resource control (RRC) layer.

FIG. 5 shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 shows a connection between an EPC and an IP multimedia subsystem (IMS).

Referring to FIG. 6, the EPC includes an MME 51, an S-GW 52, a P-GW 53a to be coupled to the IMS, a P-GW 53b to be coupled to the Internet, and a policy and charging rule function (PCRF) 58 to be coupled to the P-GW 53a.

A network technology which enables up to a wireless terminal to perform packet switching (PS) based on an Internet protocol (IP) is proposed to connect both wired/wireless terminals through all-IPs.

A network based on the IMS includes a call session control function (CSCF) for control signaling, registration, and cession processing and a session and interconnection border control function (IBCF) 62. The CSCF may include a proxy-CSCF (P-CSCF) 61 and an S-CSCF (Serving-CSCF) 63. In addition, the CSCF may include an interrogating-CSCF (I-CSCF). The P-CSCF 61 acts as a first access point for a user equipment (UE) in the IMS-based network. In addition, the S-CSCF 63 processes a session in the IMS network. That is, the S-SCSF 63 is an entity which is in charge of routing signaling, and routes the session in the IMS network. In addition, the I-CSCF acts as an access point with respect to another entity within the IMS network.

An IP-based session is controlled by a session initiation protocol (SIP) under the IMS. The SIP is a protocol for controlling the session. The SIP is a signaling protocol which specifies a procedure for finding locations by identifying UEs to be communicated, generating a multimedia service session between the UEs, and deleting and changing the generated session. The SIP uses an SIP uniform resource identifier (URI) similar to an e-mail address to distinguish each user, so that a service can be provided without being dependent on an Internet protocol (IP) address. The SIP message is a control message, but is transmitted between the UE and the IMS network through an EPC user plane.

Referring to FIG. 6, the first P-GW 53a of the EPC is coupled to the P-CSCF 61 of the IMS, the P-CSCF 61 is coupled to the IBCF 62, and the IBCF 62 is coupled to the S-CSCF 63.

In addition, the second P-GW 53b of the EPC is coupled to a network of the Internet service operator.

Hereinafter, an initial access procedure of the UE 10 is described.

According to the initial access procedure, the EPC may allocate a default bearer to the UE 10, and may register the UE 10. In addition, the UE 10 may be allocated an IP address to use an IMS network from the PGW 53, and may obtain an address of the P-CSCF 61 to register to an IMS network.

FIG. 7 is an exemplary signal flow diagram showing an initial access procedure of a UE.

Referring to FIG. 7, for an initial access, the UE 10 which has been powered on configures an RRC connection with the eNodeB 20 as described with reference to FIG. 5 (S101).

After the RRC connection with the eNodeB 20 is established, the UE 10 transmits an attach request message to the MME 51 (S103). A PDN connectivity request message may be included in the attach request message. In this case, the UE 10 may request for an address of the P-CSCF 61 by using a protocol configuration option (PCO) field.

The MME 51 performs an authentication and security setup procedure for the UE 10 in association with the HSS 54 (S105). In the authentication procedure, the MME 51 obtains an authentication vector for a subscriber from the HSS 54, and thereafter performs mutual authentication with respect to the UE 10 by using the authentication vector. When the authentication procedure is complete, the MME 51 establishes a security key for the message security setup between the UE 10 and the MME 51.

The MME 51 performs a location registration procedure to inform the HSS 54 that the UE 10 is located in a region managed by the MME 51, and receives a user profile (S107). The location registration procedure may be performed by using a diameter protocol on an S6a interface. In addition, the user profile received by the MME 51 may include an access point name (APN), a P-GW identifier, a quality of service (QoS) profile, or the like.

The MME 51 selects the P-GW 53, and transmits a create session request message to the selected P-GW 53 (S109). The create session request message may include the user profile and the PCO field requesting an address of the P-CSCF 61. The create session request message transmitted by the MME 51 may be delivered to the P-GW 53 via the S-GW 52.

The P-GW 53 allocates the IP of the UE 10, and selects an address list of the P-CSCFs 61 which can be used by the UE among a plurality of P-CSCFs 61 according to the PCO field. Optionally, the P-GW 53 transmits an 'indication of IP-CAN session establishment' message to the PCRF 58 (S111). In addition, the P-GW 53 receives an 'acknowledge of IP-CON session establishment' message from the PCRF 58 (S113). The 'acknowledge of IP-CON session establishment' message may include a policy of a service to be provided to the UE 10.

The P-GW 53 transmits a create session response message to the MME 51 (S115). The create session response message may include an IP allocated to the UE 10 and the address list of the P-CSCF 61. The create session response message transmitted by the P-GW 53 may be transmitted to the MME 51 via the S-GW 52.

The MME 51 transmits an attach accept message including an initial context setup request message to the eNodeB 20. In addition, the eNodeB 20 transmits to the UE an access accept message including an RRC connection reconfiguration message and an activate default EPS bearer context request message (S117).

In step S119, the UE 10 transmits an RRC connection reconfiguration complete message to the eNodeB 20 in response to reception of the RRC connection reconfiguration message (S119). The eNodeB 20 transmits an initial context setup response message to the MME 51 in response to reception of the initial context setup request message (S121).

The MME 51 transmits a modify bearer request message to the S-GW 52 in response to reception of the initial context setup response message (S123). The bearer modify request message may include an EPS bearer identifier, an eNodeB address, a handover indication, or the like. The S-GW 52 transmits a modify bearer response message to the MME 51 in response to reception of the modify bearer response message (S125).

Hereinafter, an IMS initial registration procedure of the UE 10 will be described.

FIG. 8 is an exemplary signal flow diagram showing an IMS initial registration procedure.

Referring to FIG. 8, the UE 10 transmits a register message requesting for a registration to the P-CSCF 61 (S201). The UE 10 may transmit a register message by using an address of the P-CSCF 61, which is identified through the activate default EPS bearer context request message.

The P-CSCF 61 delivers the register message received from the UE 10 to the I-CSCF 64 by using an address of the I-CSCF 64, which is obtained through a domain name system (DNS) query procedure (S203).

The I-CSCF 64 transmits a user authorization request (UAR) message to the HSS 54 (S205). Since there is no S-CSCF 63 allocated to the UE 10, the HSS 54 transmits to the I-CSCF 64 a user authorization answer (UAA) message including capability information of the UE 10 (S207). The capability information is information in which capability to be provided to the UE 10 is organized with an attribute value pair (AVP).

The I-CSCF 64 selects one S-CSCF 63 on the basis of the received capability information, and transmits a register message to the selected S-CSCF 63 (S209).

The S-CSCF 63 transmits a multimedia authentication request (MAR) message to the HSS 54 to request for authentication information regarding the UE 10 (S211). Since there is no authentication information regarding the UE 10 due to the IMS initial registration, the HSS 54 transmits a multimedia authentication answer (MAA) message for informing that the authentication information is required to the S-CSCF 63 (S213).

The S-CSCF 63 transmits a 401 unauthorized message for requesting for the authentication information to the UE 10 (S215). The 401 unauthorized message may include an authentication vector received from the HSS, a symmetric key designated by the S-CSCF 63, and an authentication algorithm. The 401 unauthorized message may be delivered to the UE 10 via the I-CSCF 64 and the P-CSCF 61.

The UE 10 generates authentication data by using the received authentication vector, symmetric key, and authentication algorithm, and transmits the register message including the generated authentication data to the P-CSCF 61 (S217). The P-CSCF 61 delivers the received register message to the I-CSCF 64 (S219).

The I-CSCF 64 transmits the UAR message to the HSS 54 (S221). Since the S-CSCF 63 allocated to the UE 10 exists, the HSS 54 transmits the UAA message including the identification information of the allocated S-CSCF 63 to the I-CSCF 64 since (S223). The I-CSCF 64 transmits the register message to the S-CSCF 63 (S225).

The S-CSCF 63 authenticates the UE 10 by comparing authentication data included in the register message and authentication information transmitted by the S-CSCF 63, and transmits a server assignment request (SAR) message to the HSS (S227). The HSS 54 transmits to the S-CSCF 63 a server assignment answer (SAA) message including a service profile for the UE 10 (S229).

The S-CSCF 63 transmits to the UE 10 a 200 OK message notifying that the registration is complete, thereby completing the registration procedure (S231). The 200 OK message may be delivered to the UE 100 via the I-CSCF 64 and the P-CSCF 61.

FIG. 9 is an exemplary diagram showing a roaming scheme of voice over LTE (VoLTE).

As can be seen with reference to FIG. 9, the roaming scheme of VoLTE includes a home routed (HR) scheme and a local breakout (LBO) scheme.

According to the LBO scheme, IMS signaling transmitted from a UE is delivered to an S-CSCF in a home PLMN (H-PLMN) via an S-GW/P-GW/P-CSCF in a visited public land mobile network (V-PLMN).

In the HR scheme, the IMS signaling is delivered to the S-CSCF after passing through a P-GW/P-CSCF in the H-PLMH via the S-GW in the V-PLMN.

FIG. 10 is an exemplary signal flow diagram showing an IMS registration procedure of a UE roamed to a visited network through an HR scheme.

Hereinafter, when the IMS registration procedure based on the HR scheme of the UE 10 roamed to the visited network through the HR scheme is described, the duplicated description of FIG. 8 will be omitted.

Referring to FIG. 10, the UE 10 roamed to a visited network (or V-PLMN) transmits a register message to the S-GW 52b of the visited network via an eNB. The S-GW 52b of the visited network transmits the received register message to the P-GW 53a of a home network, and the P-GW 53a transmits the received register message to the P-CSCF 61a (S301). That is, the UE 10 transmits the register message to not a control plane but a user plane.

The P-CSCF 61a subscribes a network identifier (or PLMN-ID) change notification to the PCRF 58a (S303). In this case, the PLMN-ID change notification may be subscribed through an Rx interface. The Rx interface is an interface for exchanging information between the P-CSCF 61a of an IMS network and the PCRF 58a of an EPC network.

The PCRF 58a configures the P-GW 53a to report the PLMN-ID change (S305). In addition, the P-GW 53a reports a PLMN-ID for the network (i.e., the V-PLMN) serving the UE 10 to the PCRF 58a on the basis of information obtained in the PDN setup process (S307). As the PLMN-ID change notification is subscribed for the first time, the PCRF 58a reports the PLMN-ID for the V-PLMN to the P-CSCF 61a (S309).

That is, entities of the home network acquire an identifier of the visited network (or VPLMN-ID) in an IMS registration procedure. The VPLMN-ID acquired in this manner may be used in charging, roaming registration restriction, or bear creation for an additional service, or the like.

The P-CSCF 61a adds the PLMN-ID to a P-visited-network-ID header of the register message, and delivers to the I-CSCF 64a the register message to which the PLMN-ID is added (S311).

In addition, a subsequent IMS registration procedure is performed in the same manner as described with reference to FIG. 8.

Meanwhile, when the network serving the UE 10 is changed due to a movement of the UE 10, the P-GW 53a of the home network may identify a change of the PLMN-ID. Upon identifying the change of the PLMN-ID, the P-GW 53a reports to the PCRF 58a an event occurrence based on the PLMN-ID change. Upon receiving the report of the event occurrence based on the PLMN-ID change, the PCRF 58a reports a new PLMN-ID to the P-CSCF 61a.

Meanwhile, it is preferable that the Rx interface for exchanging information between the P-CSCF and the PCRF is generated after the authentication of the UE 10 is successfully performed in the IMS registration procedure.

However, as described above with reference to FIG. 10, before the UE 10 is authenticated, the IMS registration procedure of the HR scheme generates the Rx interface between the P-CSCF and the PCRF to subscribe the PLMN-ID change notification.

As such, when the Rx interface is generated before the UE 10 is authenticated, the information regarding the unregistered UE 10 is exchanged between entities of the home network, which may cause a problem in terms of security.

In addition, even if the IMS registration procedure fails, unnecessary signaling such as the PLMN-ID change notification may occur through an Rx interface which is already activated.

SUMMARY OF THE INVENTION

Accordingly, a disclosure of the present specification aims to provide a method of effectively acquiring a visited public land mobile network (V-PLMN)-identifier (ID) when an IP multimedia subsystem (IMS) registration is performed for a user equipment (UE) roamed through a home routed (HR) scheme.

To achieve the above purpose, a disclosure of the present specification provides a method for obtaining an identifier of a V-PLMN in order to register a UE, which has roamed to the V-PLMN, to an IMS network. The method may be performed by a proxy-call session control function (P-CSCF). The method may include: receiving a response message from an interrogating-CSCF (I-CSCF) in response to transmission of a register message for registering the UE to the IMS network; verifying whether the received response message is a 401 unauthorized message; when the received response message is the 401 unauthorized message, transmitting the response message to the UE, and generating an interface for transmitting and receiving data with respect to an entity of an EPC network; and receiving the identifier of the V-PLMN from the entity of the EPC through the interface.

The method may further include, if a new register message is received from the UE, transmitting the new register message to the I-CSCF by adding the identifier of the V-PLMN to a header of the new register message.

In the receiving of the identifier of the V-PLMN, a notification for a change in the identifier of the V-PLMN may be subscribed for the entity of the EPC network through the interface, and the identifier of the V-PLMN may be received from the entity of the EPC network.

If the entity of the EPC network is a policy and charging rule function (PCRF), the interface may be a reception (Rx) reference point.

To achieve the above purpose, another disclosure of the present specification provides a method for obtaining an identifier of a V-PLMN in order to register a UE, which has roamed to the V-PLMN, to an IMS network. The method may be performed by a proxy-call session control function (P-CSCF). The method may include: when a register message is received from the UE to request for a registration to the IMS, holding the received register message and generating a temporary register message; transmitting the generated temporary register message to an I-CSCF, and receiving a response message; verifying whether the response message is a message for allowing the UE to be registered to the IMS network; when the received response message is the message for allowing the registration to the IMS network, discarding the response message, and generating an interface for transmitting/receiving data with respect to an entity of an EPC network; and receiving the identifier of the V-PLMN from the entity of the EPC through the interface.

The method may further include transmitting the register message to the I-CSCF by adding the identifier of the V-PLMN to a header of the held register message.

The message for allowing the registration to the IMS network may be any one of a 401 unauthorized message and a 200 OK message.

To achieve the above purpose, another disclosure of the present specification provides a P-CSCF for obtaining an identifier of a V-PLMN in order to register a UE, which has roamed to the V-PLMN, to an IMS network. The P-CSCF may include: a transceiver; and a processor controlling the transceiver. The processor is configured to: control the transceiver to receive a response message from an I-CSCF in response to transmission of a register message for registering the UE to the IMS network; verify whether the received response message is a 401 unauthorized message; control the transceiver to transmit the response message to the UE and generate an interface for transmitting and receiving data with respect to an entity of an EPC network, when the received response message is the 401 unauthorized message; and control the transceiver to receive the identifier of the V-PLMN from the entity of the EPC through the interface.

To achieve the above purpose, another disclosure of the present specification provides a P-CSCF for obtaining an identifier of a V-PLMN in order to register a UE, which has roamed to the V-PLMN, to an IMS network. The P-CSCF may include: a transceiver; and a processor controlling the transceiver. The processor may be configured to: hold the received register message and generate a temporary register message when a register message is received from the UE to request for a registration to the IMS; control the transceiver to transmit the generated temporary register message to an I-CSCF, and receive a response message; verify whether the response message is a message for allowing the UE to be registered to the IMS network; control the transceiver to discarding the response message, and generate an interface for transmitting/receiving data with respect to an entity of an EPC network, when the received response message is the message for allowing the registration to the IMS network; and control the transceiver to receive the identifier of the V-PLMN from the entity of the EPC through the interface.

According to a disclosure of the present specification, since a visited public land mobile network (V-PLMN)-identifier (ID) is acquired through a reception (Rx) interface generated after a user equipment (UE) is authenticated in an IP multimedia subsystem (IMS) registration procedure, it is possible to solve a problem in which entities of a home network exchange information regarding an unregistered UE.

In addition, since the Rx interface is not generated when the IMS registration procedure fails, it is possible to solve a problem in which unnecessary signaling occurs between the entities of the home network.

DESCRIPTION OF EXEMPLARY EMBODIMENTS

Figure 1:
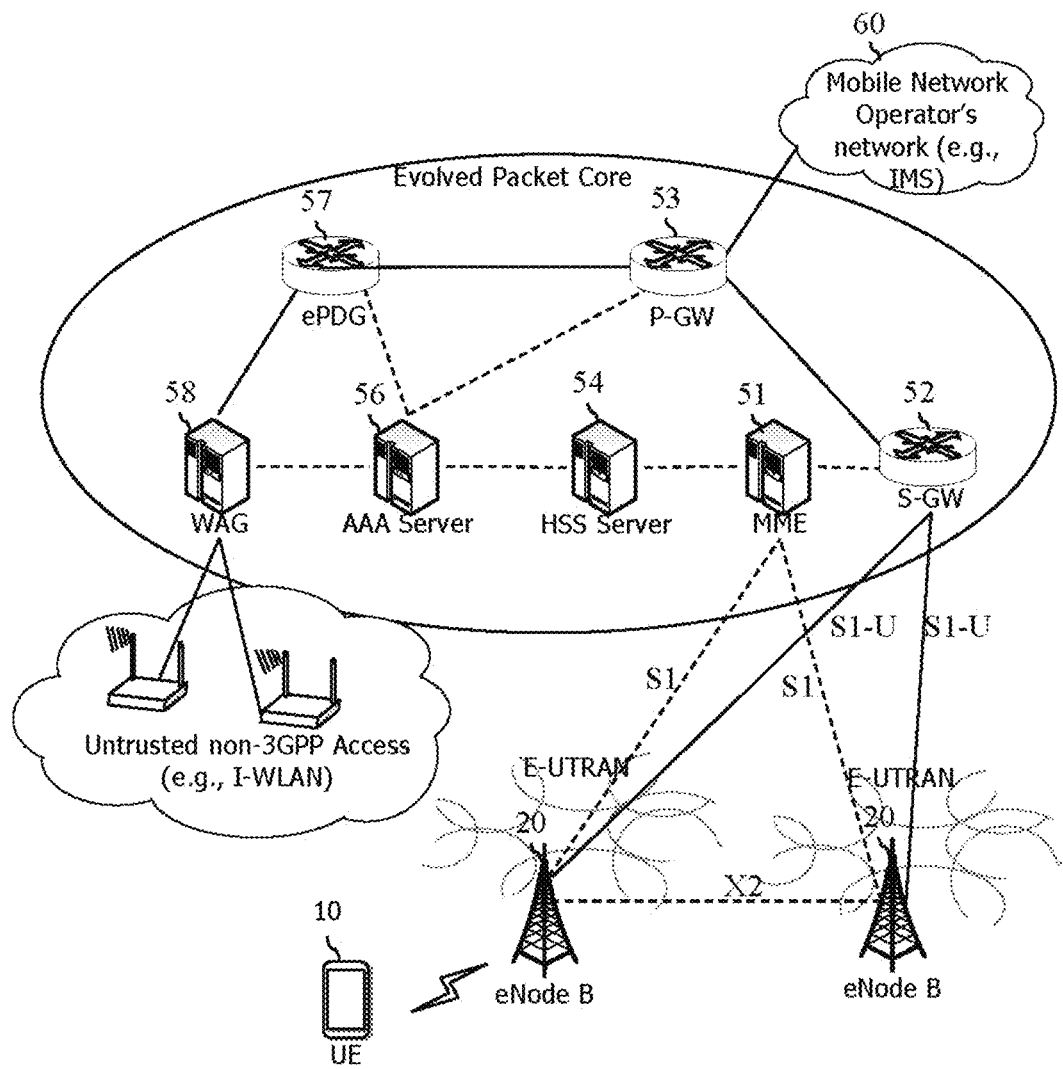
FIG. 1 shows the configuration of an evolved mobile communication network.
Figure 2:
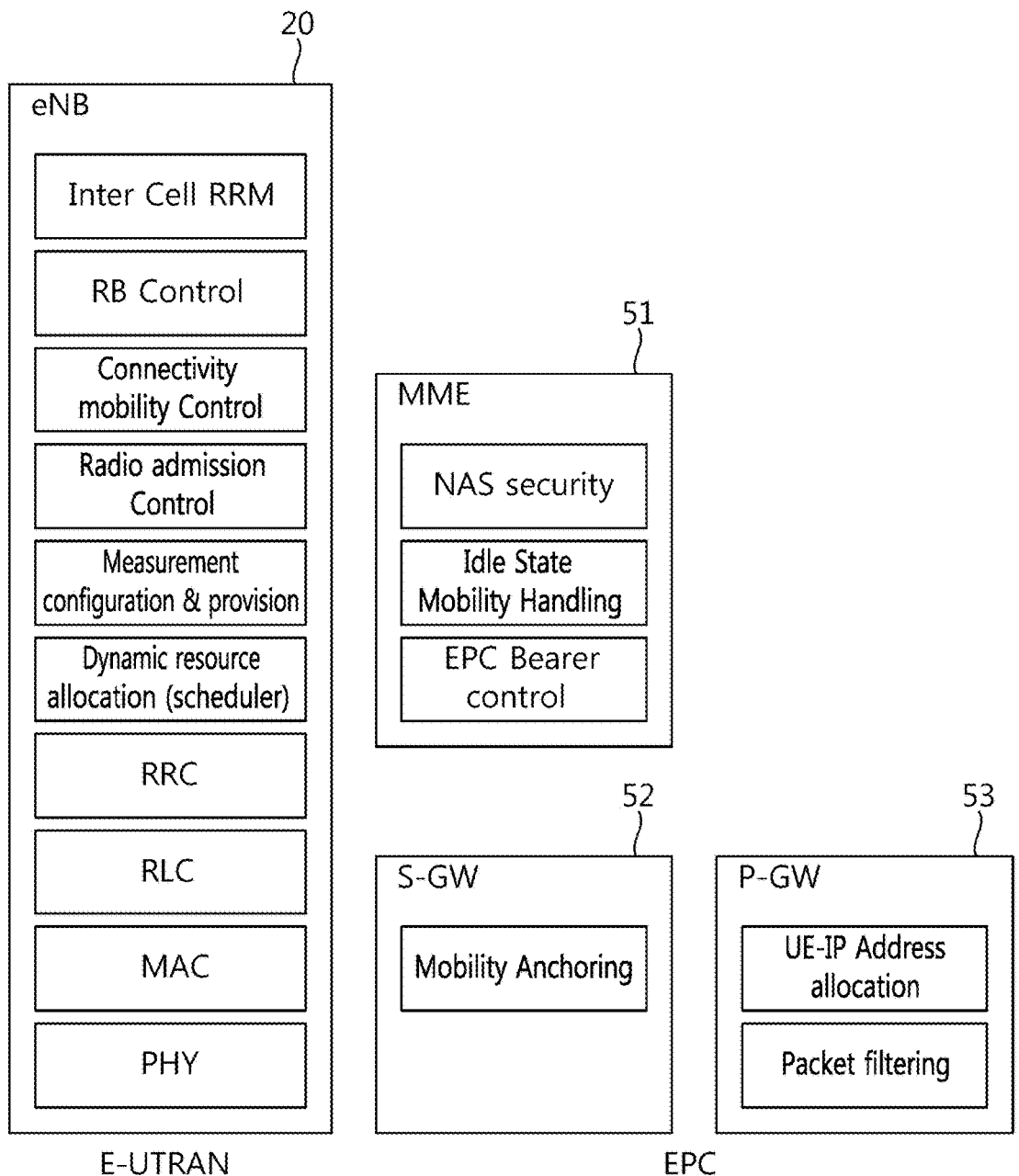
FIG. 2 is an exemplary diagram showing the architecture of a common E-UTRAN and a common EPC.
Figure 3:
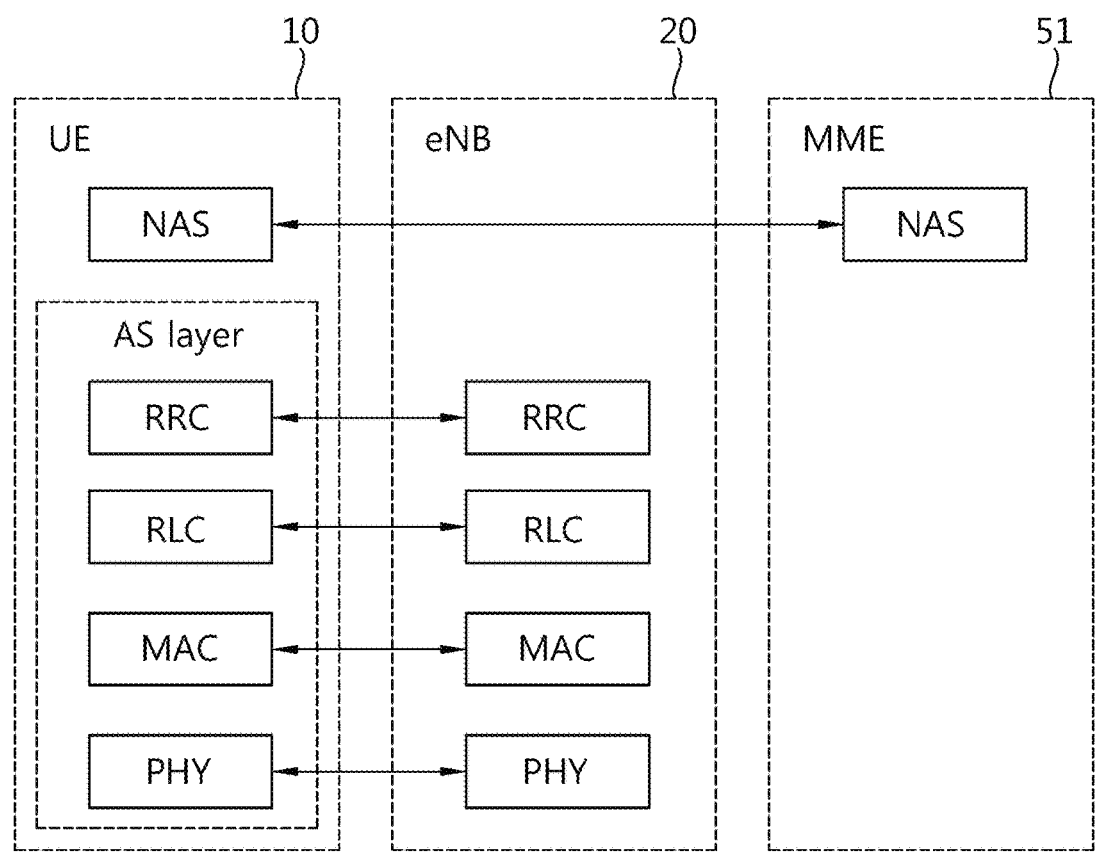
FIG. 3 is an exemplary diagram showing the structure of a radio interface protocol in a control plane between UE and an eNodeB
Figure 4:
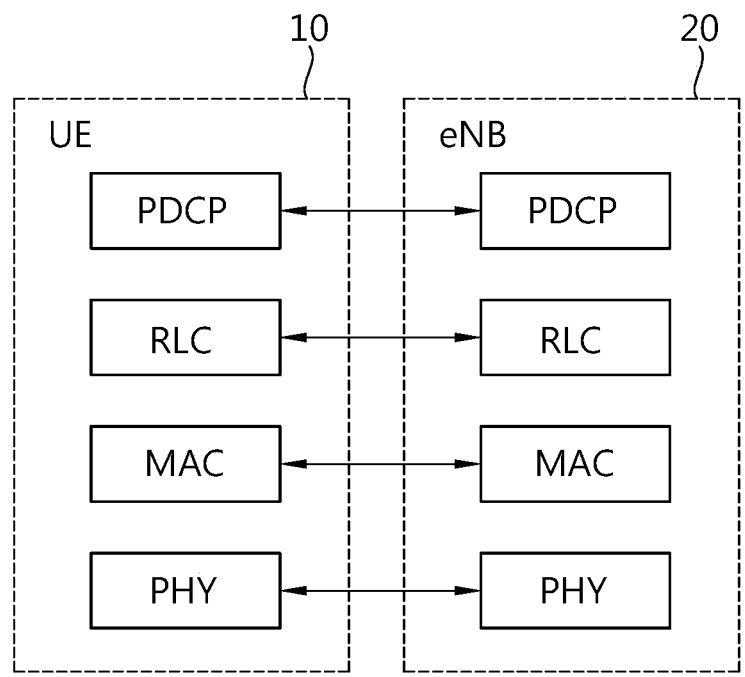
FIG. 4 is another exemplary diagram showing the structure of a radio interface protocol in a control plane between UE and an eNodeB.
Figure 5:
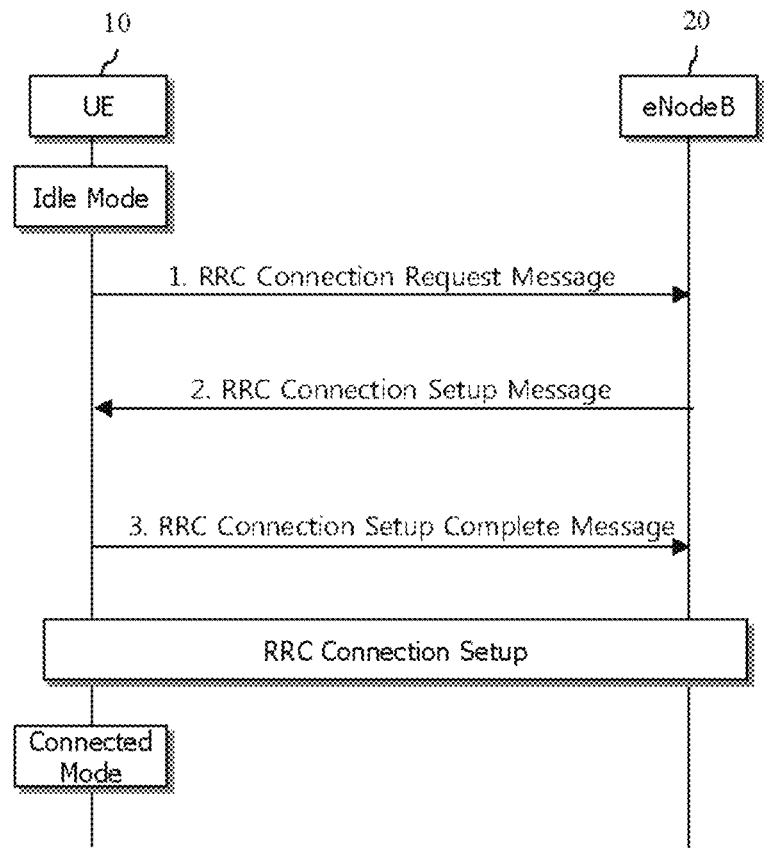
FIG. 5 illustrates a connection process in a radio resource control (RRC) layer.
Figure 6:
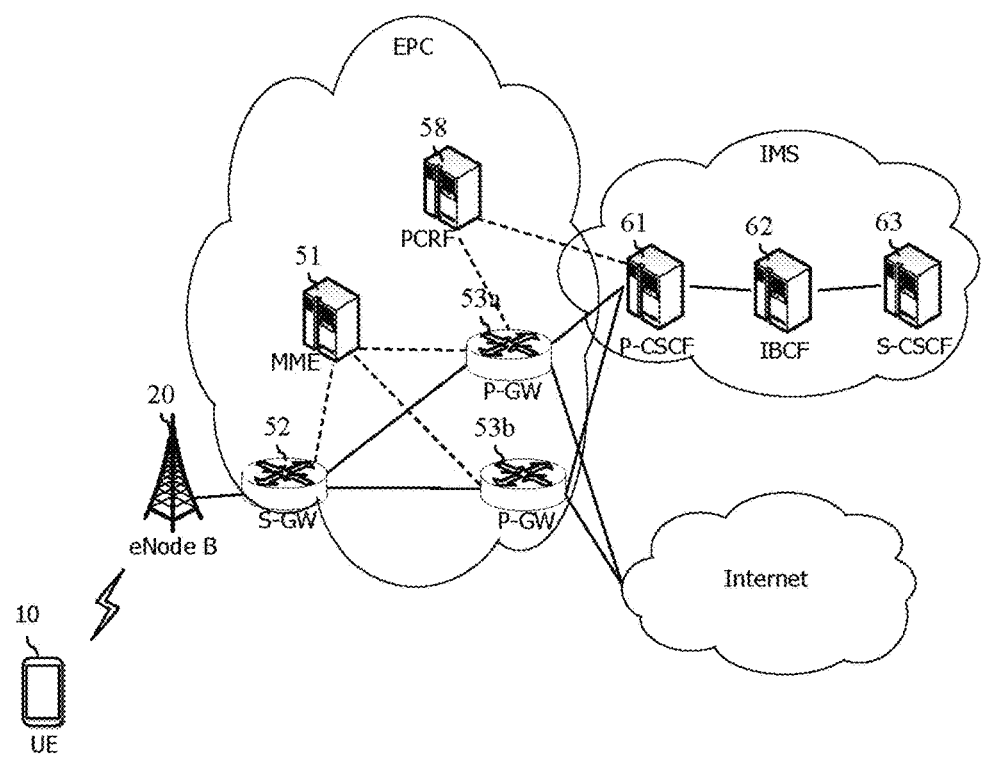
FIG. 6 shows a connection between an EPC and an IP multimedia subsystem (IMS).
Figure 7:
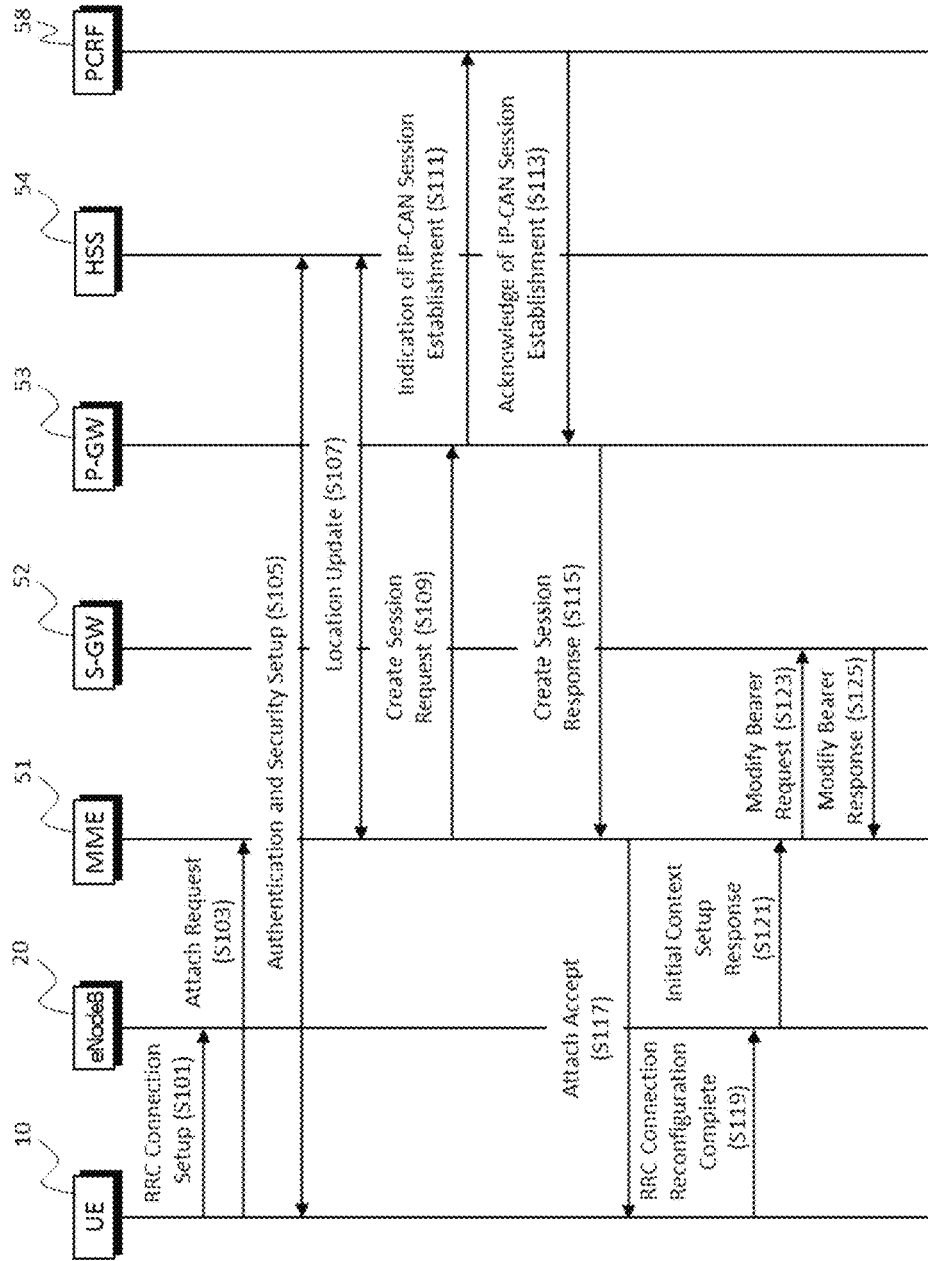
FIG. 7 is an exemplary signal flow diagram showing an initial access procedure of a UE.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<Definition of Terms>

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Meanwhile, an embodiment proposed hereinafter may be implemented alone, or may be implemented by combining several embodiments.

<Disclosure of the Present Specification>

The present specification discloses a method of effectively obtaining a visited public land mobile network (V-PLMN)-identifier (ID) when an IMS registration is performed on a UE which has roamed to a visited network through an HR scheme. In particular, the present specification proposes a method of generating an Rx interface between a P-CSCF and a PCRF after a minimum level of authentication is performed on the UE, when the IMS registration is performed on the UE roamed to the visited network through the HR scheme.

1. First Scheme According to a Disclosure of the Present Specification

The first scheme according to the disclosure of the present specification is a scheme of additionally performing a process of identifying whether an IMS registration of a UE can be allowed before an Rx interface is generated between a P-CSCF and a PCRF. As such, the process of identifying whether the IMS registration of the UE can be allowed may be implemented by applying a message of the conventional IMS registration procedure. Therefore, the process of identifying whether the IMS registration of the UE can be allowed is referred to as a temporary IMS registration procedure.

Figure 11:
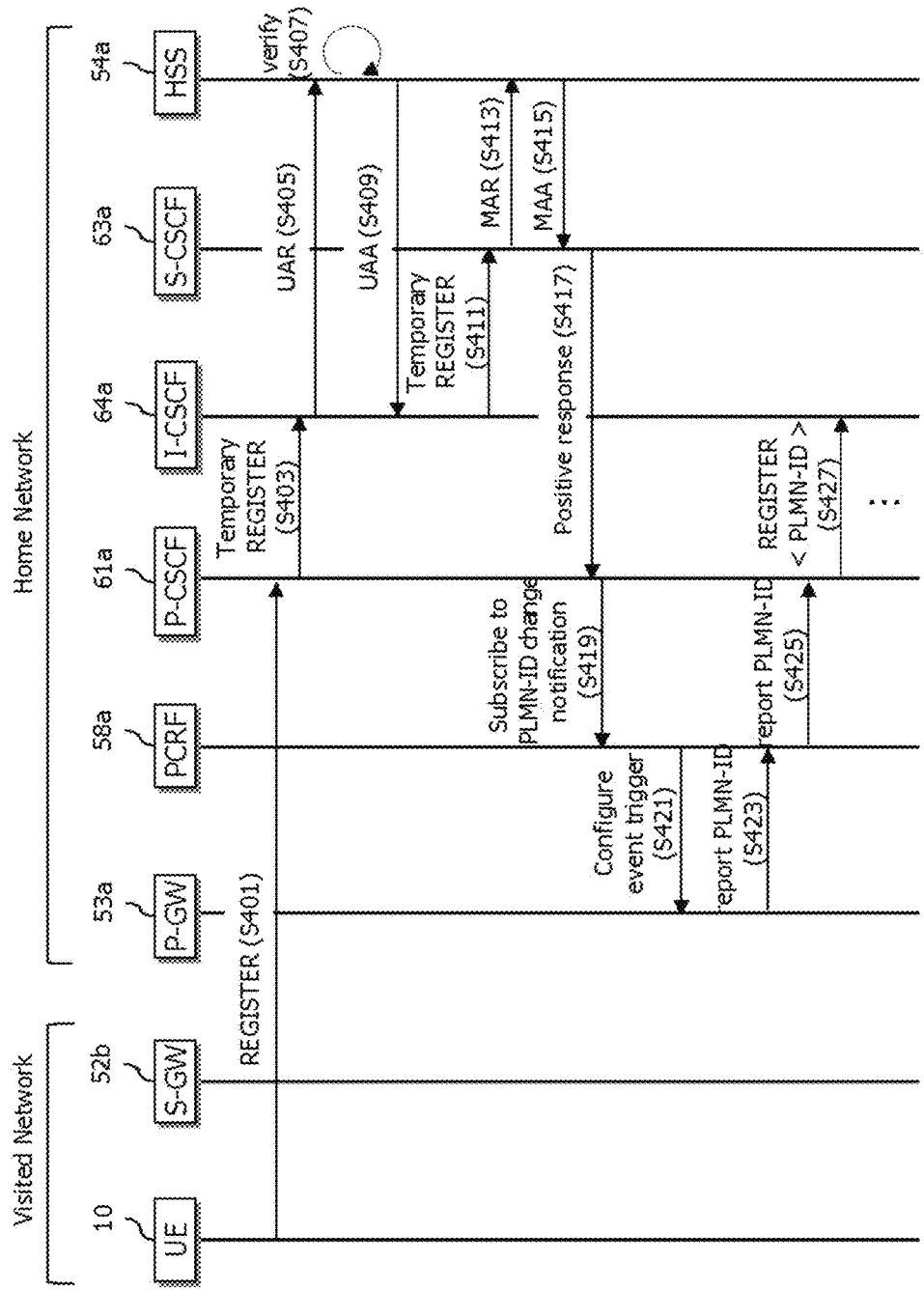
FIG. 11 to FIG. 14 are signal flow diagrams showing first to fourth schemes according to a disclosure of the present specification.

FIG. 11 is a signal flow diagram showing a first scheme according to a disclosure of the present specification.

Referring to FIG. 11, the UE 10 roamed to a visited network (or V-PLMN) transmits a register message for IMS registration (S401). The register message transmitted by the UE 10 may be delivered to the P-CSCF 61a of a home network via the S-GW 52b of the visited network and the P-GW 53a of the home network through an HR scheme.

The P-CSCF 61a preferentially performs the temporary IMS registration procedure before a PLMN-ID change notification is subscribed to the PCRF 58a. That is, in order to be configured to report the PLMN-ID change, an Rx interface is inevitably generated between the -CSCF 61a and the PCRF 58a. Therefore, the P-CSCF 61a performs a minimum level of authentication on the UE 10 before the PLMN-ID change notification is subscribed to the PCRF 58a.

More specifically, the P-CSCF 61a holds a register message received from the UE 10, and transmits a temporary register message autonomously generated to the I-CSCF 64a (S403). If it is determined that the UE 10 is in an HR-based roaming state on the basis of the register message received from the UE, the P-CSCF 61a may transmit the temporary register message by including an indicator for informing that the UE 100 is in the HR-based roaming state. In addition, the P-CSCF 61a temporarily stores the register message received from the UE 10 until a minimum level of authentication is performed on the UE.

The I-CSCF 64a transmits a UAR message to the HSS 54a (S405). In particular, the I-CSCF 64a may transmit the UAR message by including the IP address of the UE 10.

The HSS 54a identifies whether the IMS registration of the UE 10 is allowed based on an IP address and subscriber information of the UE 10 included in the UAR message (S407). For this, the HSS 54a may have configuration information regarding a mapping relationship between the PLMN and an IP address pool. Alternatively, when the configuration information is required, the HSS 54a may obtain the configuration information from another entity. The HSS 54a may determine that the IMS registration of the UE 10 is allowed when the IP address of the UE 10 included in the UAR message is included in the IP address pool. When the IMS registration of the UE is allowed, the HSS 54a transmits a UAA message to the I-CSCF 64a (S409). Otherwise, when it is determined that the IMS registration of the UE 10 is not allowed, the HSS 54a may transmit a message for preventing the IMS registration of the UE 10 to the P-CSCF 61a. In this case, the P-CSCF 61a may transmit an IMS registration failure message to the UE 10.

The I-CSCF 64a delivers the temporary register message to the S-CSCF 63a on the basis of the received UAA message (S411).

The S-CSCF 63a transmits an MAR message to the HSS 54a to request for authentication information regarding the UE (S413). When the IMS registration of the UE is allowed, the HSS 54a transmits an MAA message to the S-CSCF 63a (S415).

When it is determined that the IMS registration of the UE 10 is allowed on the basis of the MAA message received from the HSS 54a, the S-CSCF 63a transmits to the P-CSCF 61a a message notifying that the authentication of the UE 10 is allowed (S417). Herein, the message notifying that the authentication of the UE is allowed may be either a 401 unauthorized message or a 200 OK message. However, the present invention is not limited thereto, and the message may a message obtained by processing the 401 unauthorized message or the 200 OK message. The message notifying that the authentication of the UE 10 is allowed may be delivered to the P-CSCF 61a via the I-CSCF 64a.

When the P-CSCF 61a receives a message notifying that the authentication of the UE 10 is allowed, the P-CSCF 61a determines that a minimum level of authentication is performed on the UE 10, and generates an Rx interface. The P-CSCF 61a subscribes a PLMN-ID change notification to the PCRF 58a through the generated Rx interface (S419). The P-CSCF 61 does not deliver to the UE 10 the message notifying that the authentication of the UE 10 is allowed.

That is, in the first scheme, the message notifying that authentication of the UE 10 is allowed serves as a trigger for generating the Rx interface.

According to the conventional IMS registration procedure, the P-CSCF 61a transmits the 401 unauthorized message received from the I-CSCF 64a to the UE 10 without any processing, whereas the P-CSCF 61a according to the first scheme needs to verify whether the PLMN-ID change notification is subscribed to the RCPF 58a on the basis of the 401 unauthorized message received from the I-CSCF 64a.

The PCRF 58a configures the P-GW 53a to report the PLMN-ID change (S421). The P-GW 53a reports a PLMN-ID for a network (i.e., V-PLMN) serving the UE 10 to the PCRF 58a (S423). In addition, the PCRF 58a reports the PLMN-ID for the V-PLMN to the P-CSCF 61a (S425).

The P-CSCF 61a adds the received PLMN-ID to a P-Visited-Network-ID header of the held register message, and delivers it to the I-CSCF 64a (S427).

Figure 8:
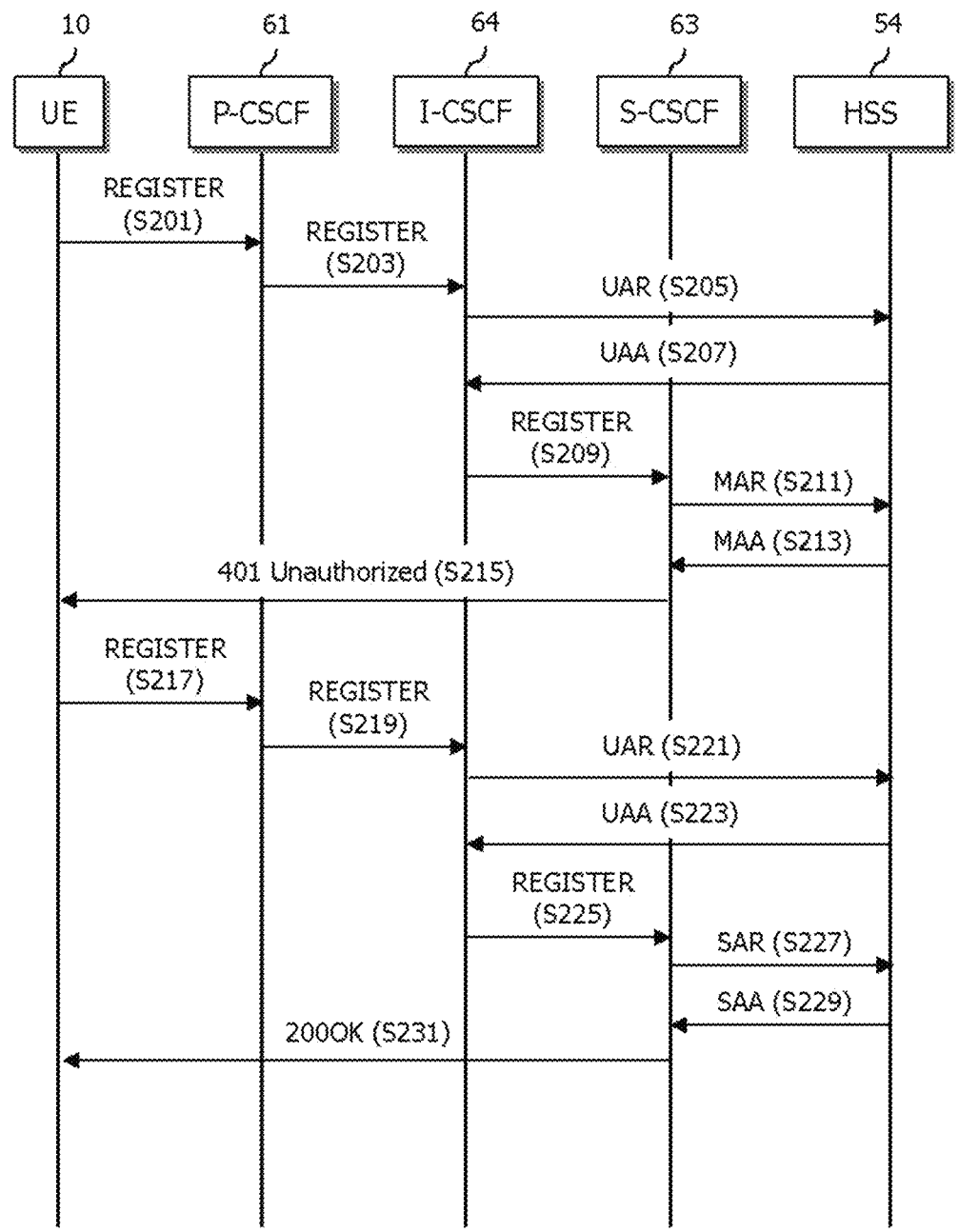
FIG. 8 is an exemplary signal flow diagram showing an IMS initial registration procedure.
Figure 9:
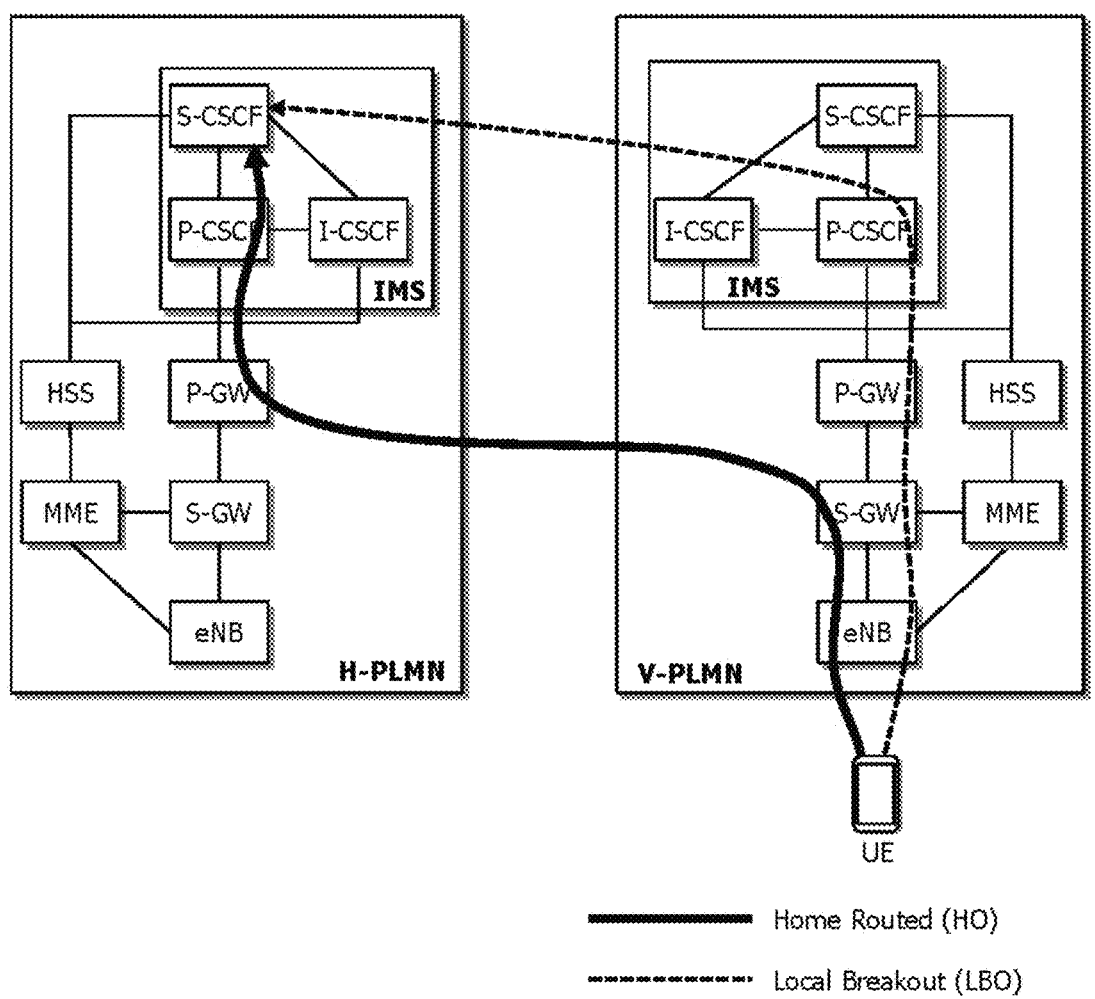
FIG. 9 is an exemplary diagram showing a roaming scheme of voice over LTE (VoLTE).
Figure 10:
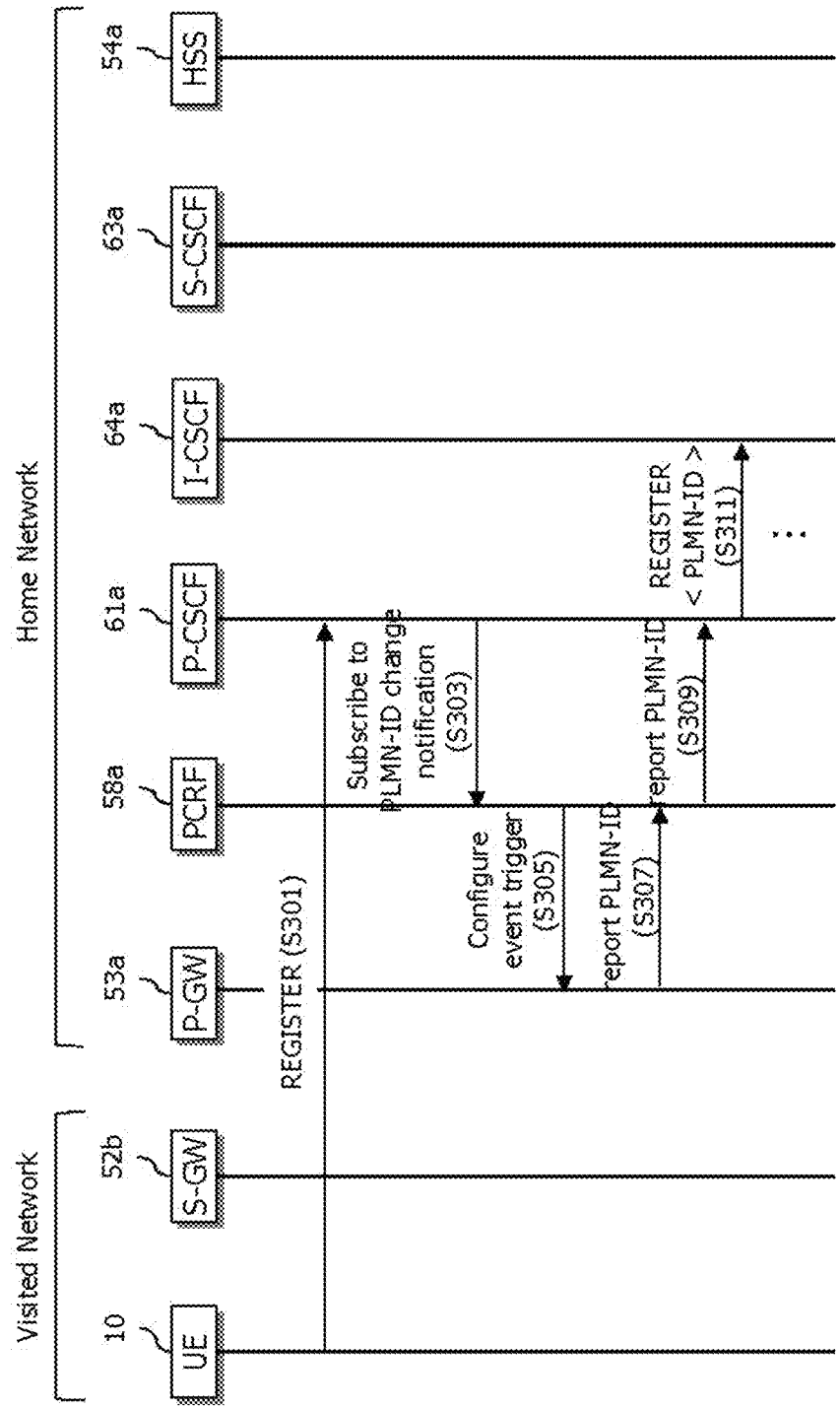
FIG. 10 is an exemplary signal flow diagram showing an IMS registration procedure of a UE roamed to a visited network through an HR scheme.

In addition, a subsequent IMS registration procedure is performed in the same manner as described with reference to FIG. 8.

2. Second Scheme According to a Disclosure of the Present Specification

The second scheme according to the disclosure of the present specification is a scheme of performing a minimum level of authentication on the UE 10 before an Rx interface is generated, by applying the conventional IMS registration procedure without having to additionally perform a temporary IMS registration procedure.

Figure 12:
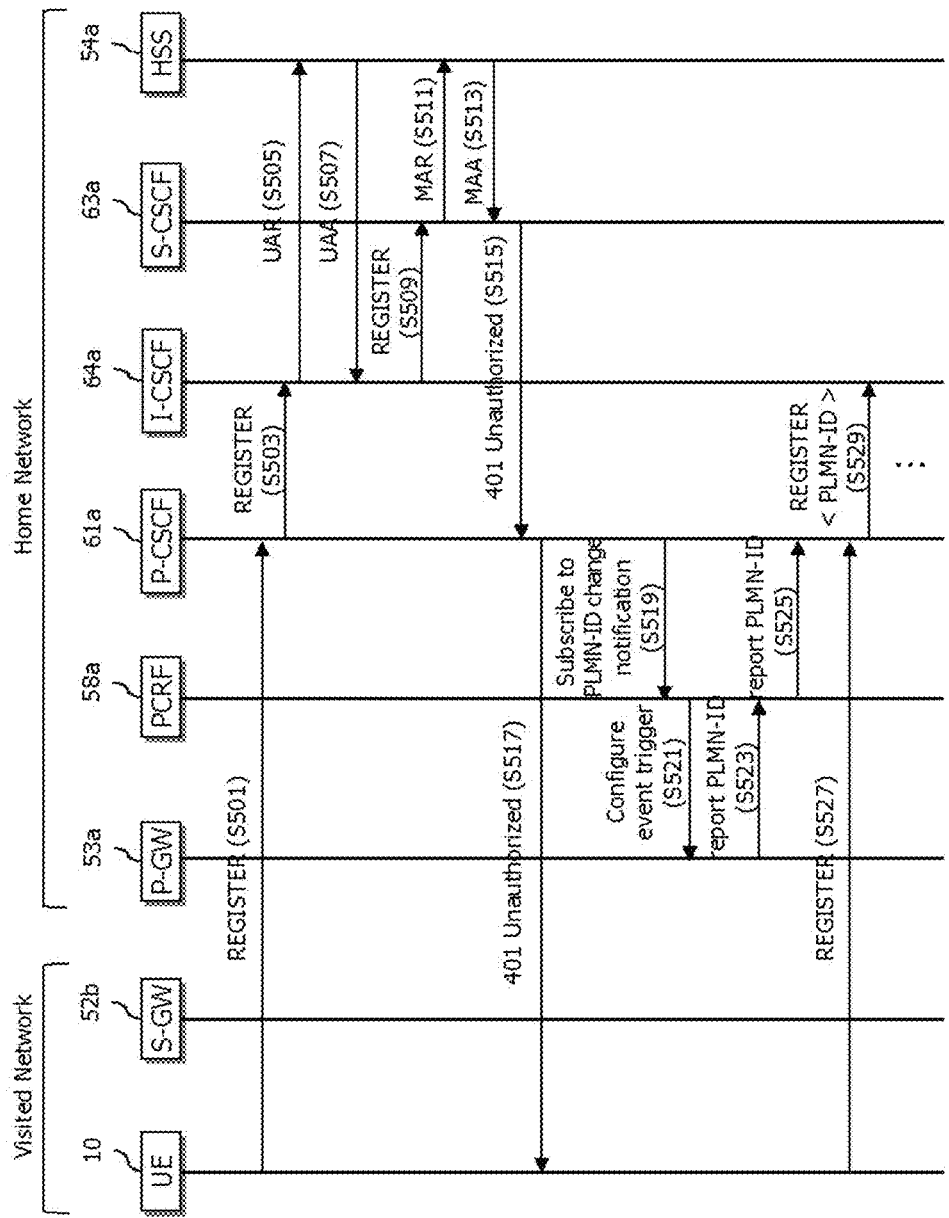

FIG. 12 is a signal flow diagram showing a second scheme according to a disclosure of the present specification.

Referring to FIG. 12, the UE 10 roamed to a visited network (or V-PLMN) transmits a register message for IMS registration (S501). The register message transmitted by the UE 10 may be delivered to the P-CSCF 61a of a home network via the S-GW 52b of the visited network and the P-GW 53a of the home network through an HR scheme.

The P-CSCF 61a transmits the register message received from the UE 10 to the I-CSCF 64a (S503). The I-CSCF 64a transmits a UAR message to the HSS 54a (S505). In particular, the I-CSCF 64a may transmit the UAR message by including an IP address of the UE 10. The HSS 54a identifies whether the IMS registration of the UE 10 is allowed based on an IP address and subscriber information of the UE 10 included in the UAR message (S507). For this, the HSS 54a may have configuration information regarding a mapping relationship between the PLMN and an IP address pool. Alternatively, when the configuration information is required, the HSS 54a may obtain the configuration information from another entity. The HSS 54a may determine that the IMS registration of the UE 10 is allowed when the IP address of the UE 10 included in the UAR message is included in the IP address pool.

When the IMS registration of the UE is allowed, the HSS 54a transmits a UAA message to the I-CSCF 64a (S507). Otherwise, when it is determined that the IMS registration of the UE 10 is not allowed, the HSS 54a may transmit a message for preventing the IMS registration of the UE 10 to the P-CSCF 61a. In this case, the P-CSCF 61a may transmit an IMS registration failure message to the UE 10.

The I-CSCF 64a transmits the register message received from the UE 10 to the S-CSCF 63a on the basis of the received UAA message (S509).

The S-CSCF 63a transmits an MAR message to the HSS 54a to request for authentication information regarding the UE 10 (S511). Since there is no authentication information for the UE 10 due to the IMS initial registration, an MAA message for informing that the authentication information is required is transmitted to the S-CSCF 63*a* (S513).

The S-CSCF 63*a* transmits a 401 unauthorized message for a request of the authentication information to the P-CSCF 61*a* (S515). The 401 unauthorized message may be delivered to the P-CSCF 61*a* via the I-CSCF 64*a*.

Upon receiving the 401 unauthorized message, the P-CSCF 61*a* transmits the 401 unauthorized message to the UE 10 (S517). In addition, the P-CSCF 61*a* determines that a minimum level of authentication is performed on the UE 10, and generates an Rx interface.

The P-CSCF 61*a* subscribes a PLMN-ID change notification to the PCRF 58*a* through the generated Rx interface (S519). That is, in the second scheme, the 401 unauthorized message acts as a trigger for generating the Rx interface.

The PCRF 58*a* configures the P-GW 53*a* to report the PLMN-ID change (S521). The P-GW 53*a* reports the PLMN-ID for a network (i.e., V-PLMN) serving the UE 10 to the PCRF 58*a* (S523). In addition, the PCRF 58*a* reports a PLMN-ID for the V-PLMN to the P-CSCF 61*a* (S525).

When a new register message including authentication data is received from the UE 10 (S527), the PCRF 58*a* adds the received PLMN-ID to a P-Visited-Network-ID header of the received register message, and delivers it to the I-CSCF 64*a* (S429).

In addition, a subsequent IMS registration procedure is performed in the same manner as described with reference to FIG. 8.

3. Third Scheme According to a Disclosure of the Present Specification

The third scheme according to the disclosure of the present specification is a scheme in which a PCRF autonomously performs a minimum level of authentication on a UE while generating up to an Rx interface in an IMS registration procedure.

Figure 13:
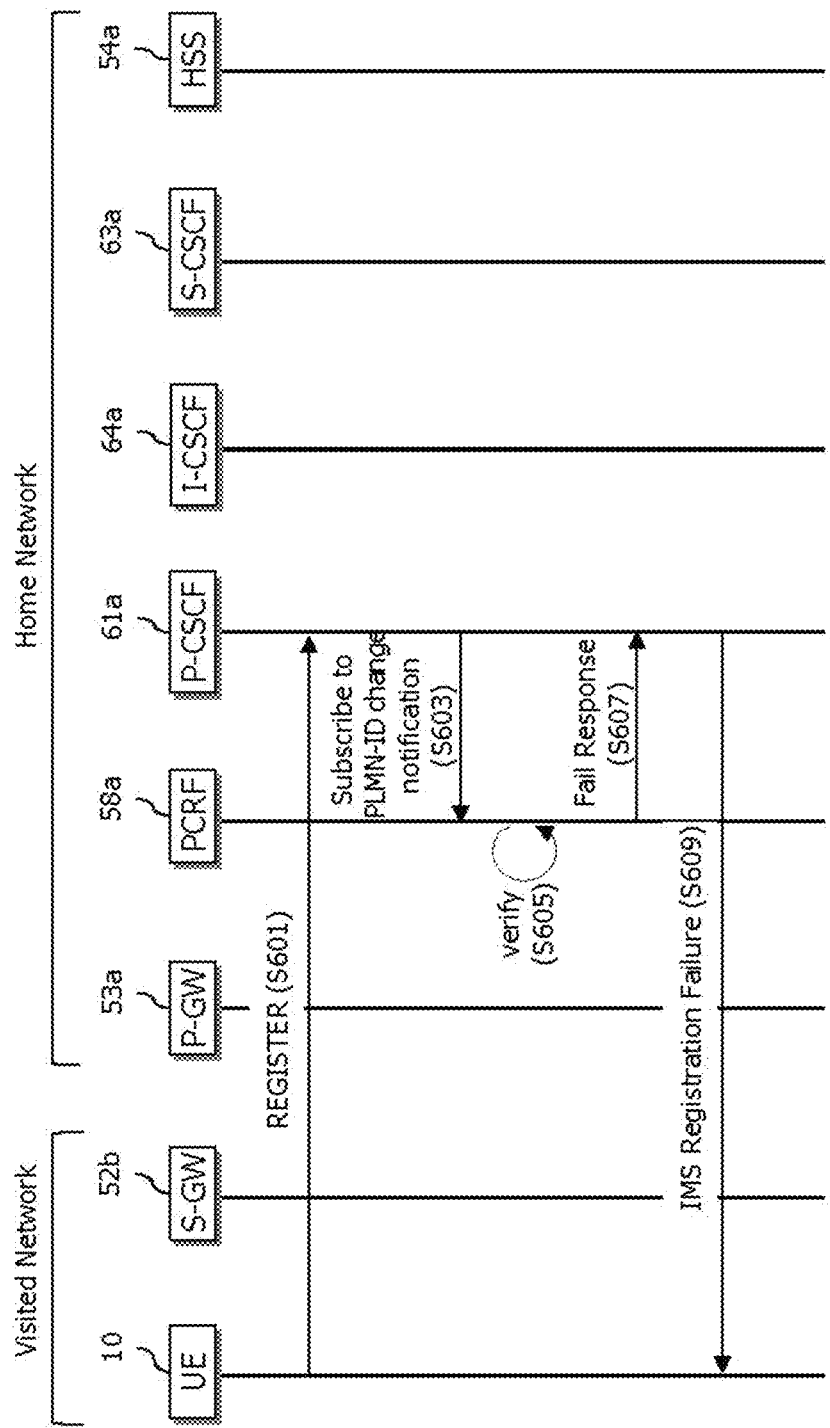

FIG. 13 is a signal flow diagram showing a third scheme according to a disclosure of the present specification.

Referring to FIG. 13, the UE 10 roamed to a visited network (or V-PLMN) transmits a register message for IMS registration (S601). The register message transmitted by the UE 10 may be delivered to the P-CSCF 61*a* of a home network via the S-GW 52*b* of the visited network and the P-GW 53*a* of the home network through an HR scheme.

The P-CSCF 61*a* subscribes a network identifier (or PLMN-ID) change notification to the PCRF 58*a* (S603).

Upon receiving a request for subscribing a PLMN change notification, the PCRF 58*a* verifies whether the IMS registration of the UE 10 is allowed (S605). Specifically, the PCRF 58*a* may verify whether the IMS registration is requested from the normal UE 10. In addition, the PCRF 58*a* may verify whether the IMS registration of the UE can be allowed according to an operator's policy or the like.

More specifically, the PCRF 58*a* may verify whether the IMS registration is requested from the normal UE 10 by verifying whether an initial access procedure for an EPS network of the UE 10 is performed according to a normal procedure, whether a PDN connectivity is normally generated, whether a register message for the IMS registration is transmitted through the normally generated PDN connectivity, or whether it corresponds to the normal UE on the basis of subscriber information obtained from a user data repository (UDR) or a user subscription repository (SPR). In addition, the PCRF 58*a* may verify whether the IMS registration is requested from the normal UE 10 in comparison with an identifier and IP address (i.e., information acquired in an EPS level) of a UE which has established a PDN connectivity and an identifier and IP address (i.e., information acquired in an IMS level) of the UE 10 which has transmitted the register message. That is, the PCRF 58*a* may verify whether the IMS registration is requested from the malicious UE 10.

In addition, even if the IMS registration is requested from the normal UE 10, the PCRF 58*a* may verify whether it is allowed to provide a PLMN-ID to the P-CSCF 61*a* in accordance with a roaming agreement of an operator or a local policy of the operator.

If the IMS registration is requested from the malicious UE 10 or if it is not allowed to provide the PLMN-ID to the P-CSCF 61*a* according to the operator's policy, the PCRF 58*a* may transmit a negative response for a notification subscription request for the PLMN change of the P-CSCF 61*a* (S607).

When the negative response is received from the PCRF 58*a*, the P-CSCF 61 transmits an IMS registration failure message to the UE 10 (S609).

4. Fourth Scheme According to a Disclosure of the Present Specification

The fourth scheme according to the disclosure of the present specification is a scheme for releasing a pre-generated Rx interface when an IMS registration of the UE 10 fails in an IMS registration procedure.

Figure 14:
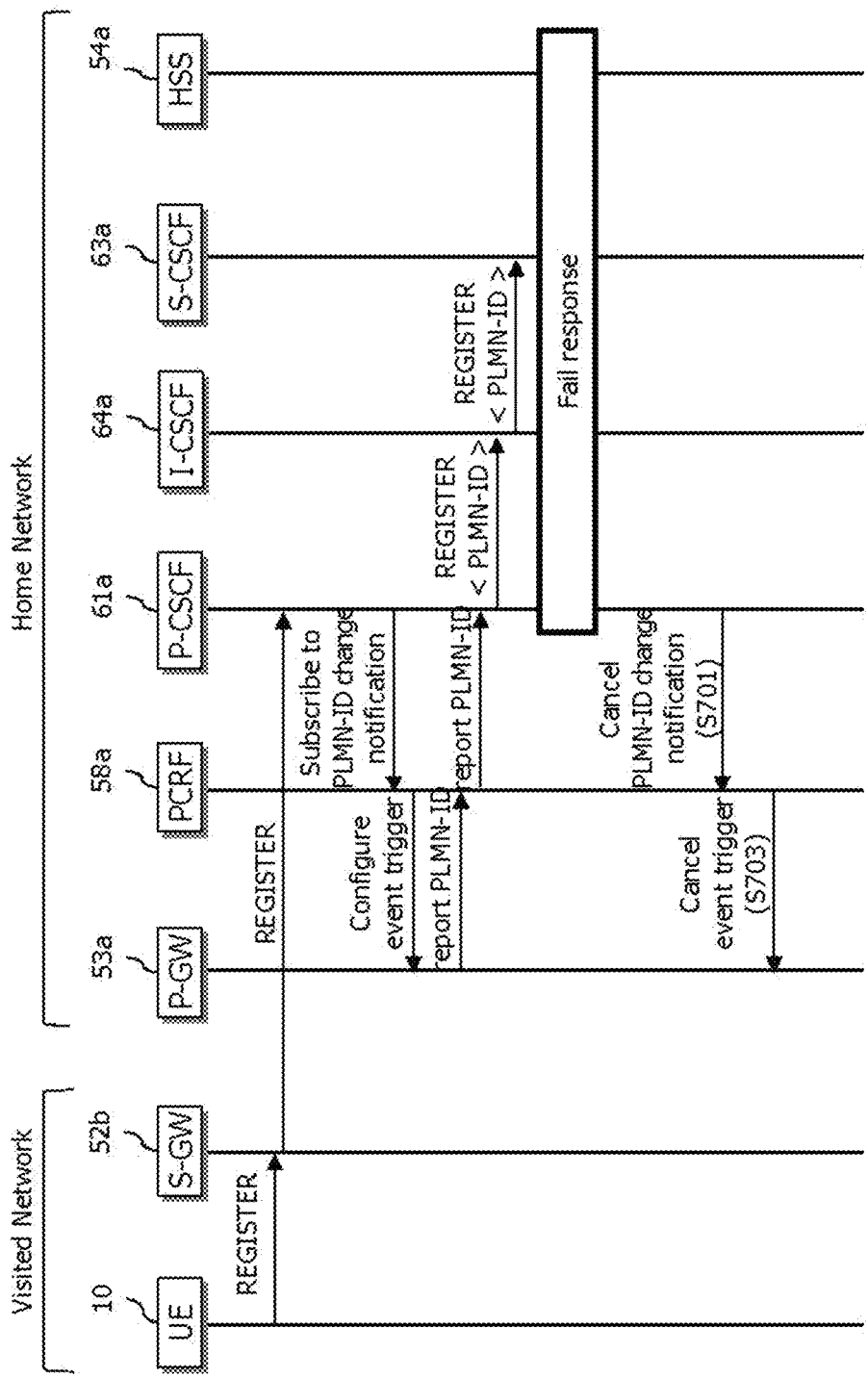

FIG. 14 is signal flow diagram showing a fourth scheme according to a disclosure of the present specification.

A case where a message for informing an IMS registration failure to the P-CSCF 61*a* is received after a PLMN-ID change notification is subscribed to the PCRF 58*a* through a pre-generated Rx interface is assumed in the scheme according to FIG. 14. A notification registration procedure for a PLMN-ID change and an Rx interface generation of the P-CSCF 61*a* is the same as described above with reference to FIG. 11 to FIG. 13.

Referring to FIG. 14, the P-CSCF 61*a*, which has received a message for notifying the IMS registration failure, requests the PCRF 58*a* to release the PLMN-ID change notification (S701).

The PCRF 58*a* configures the P-GW 53*a* not to report the PLMN-ID change any more (S703). In addition, the P-CSCF 61*a* releases an Rx interface generated between the P-CSCF 61 and the PCRF 58*a*.

Figure 15:
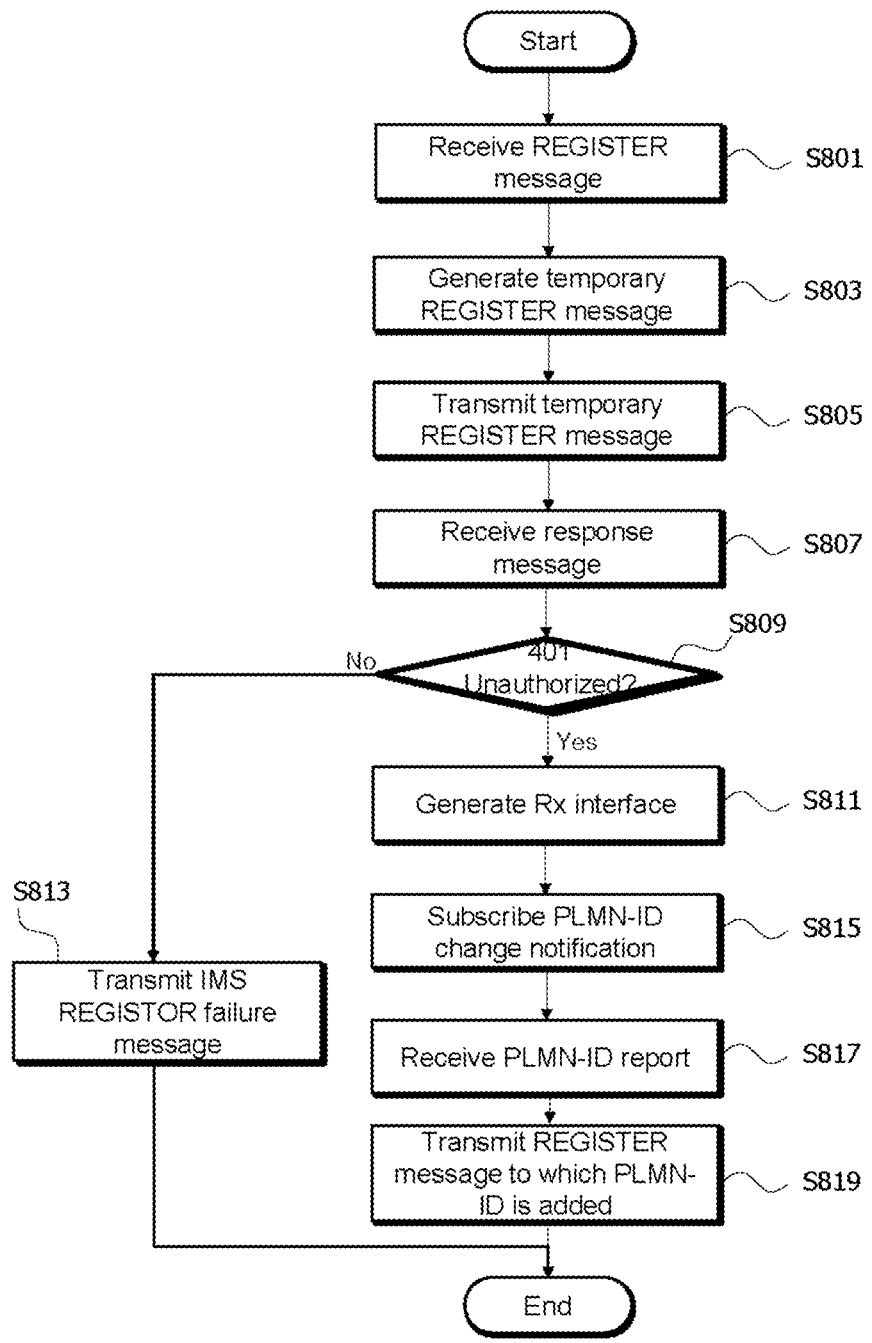
FIG. 15 is a flowchart showing a method in which a P-CSCF performs the first scheme according to a disclosure of the present specification.

FIG. 15 is a flowchart showing a method in which the P-CSCF performs the first scheme according to a disclosure of the present specification.

Referring to FIG. 15, the P-CSCF receives a register message from the UE (S801). The P-CSCF holds a delivery of the received register message, and generates a temporary register message (S803).

The P-CSCF transmits the generated temporary register message to the I-CSCF (S805). The P-CSCF receives a response message from the I-CSCF (S807).

The P-CSCF verifies whether the received response message is a 401 unauthorized message (S809). As a result of the verification, if it is a 401 unauthorized message, the P-CSCF discards the response message and generates an Rx interface for transmitting and receiving data with respect to the PCRF (S811). On the contrary, if the registration to the IMS network is not allowed, the P-CSCF transmits an IMS registration failure message to the UE and ends this process (S813).

The P-CSCF subscribes a PLMN-ID change notification to the PCRF through the Rx interface (S815). The P-CSCF receives a report for the PLMN-ID from the PCRF (S817). The P-CSCF adds the PLMN-ID to a header of the held register message and transmits it to the I-CSCF (S819).

Figure 16:
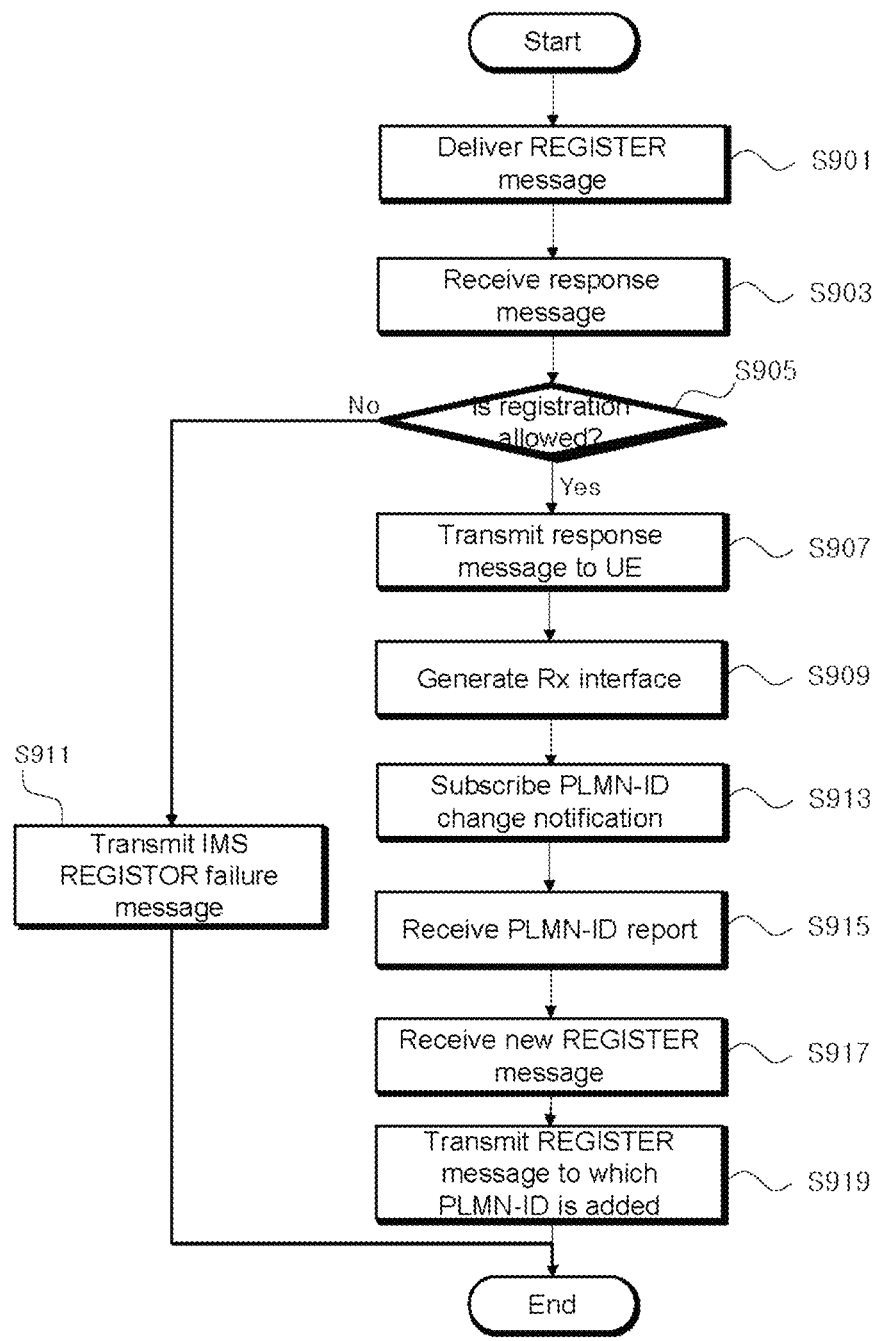
FIG. 16 is a flowchart showing a method in which a P-CSCF performs the second scheme according to a disclosure of the present specification.

FIG. 16 is a flowchart showing a method in which the P-CSCF performs the second scheme according to a disclosure of the present specification.

Referring to FIG. 16, the P-CSCF transmits a register message received from the UE to the I-CSCF (S901). The P-CSCF receives a response message from the l-CSCF (S903).

The P-CSCF verifies whether the received response message is a message for allowing a registration to the IMS network of the UE (S905). Herein, the message for allowing the registration to the IMS network may be either a 401 unauthorized message or a 200 OK message.

As a result of the verification, if the message allows the registration to the IMS network, the P-CSCF transmits a response message to the UE (S907). In addition, the P-CSCF generates an RX interface for transmitting and receiving data with respect to the PCRF (S909). On the contrary, if the registration to the IMS network is not allowed, the P-CSCF transmits an IMS registration failure message to the UE (S911).

The P-CSCF subscribes a PLMN-ID change notification to the PCRF through the Rx interface (S913). The P-CSCF receives a report for the PLMN-ID from the PCRF (S915).

The P-CSCF receives a new register message from the UE (S917). The P-CSCF adds the PLMN-ID to a header of a new register message and transmits it to the I-CSCF (S919).

The aforementioned embodiments of the present invention can be implemented through various means. For example, the embodiments of the present invention can be implemented in hardware, firmware, software, combination of them, etc.

Figure 17:
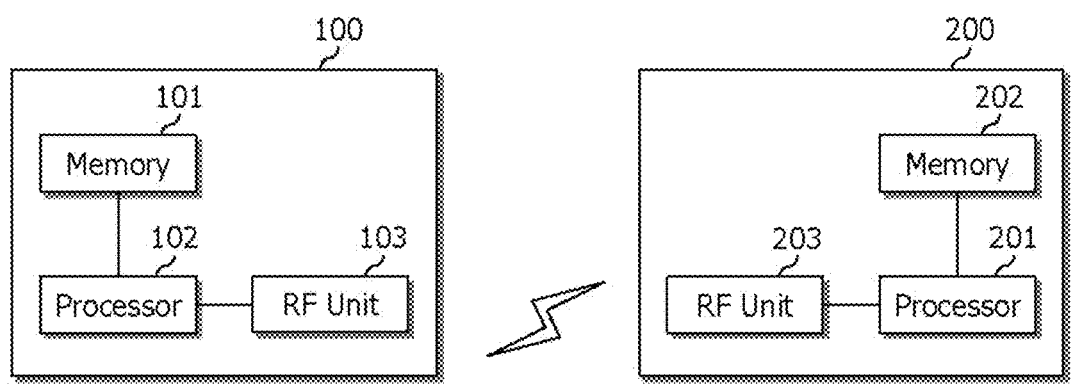
FIG. 17 is a block diagram showing a structure of a UE and a P-CSCF according to a disclosure of the present specification.

FIG. 17 is a block diagram showing a structure of a UE and a P-CSCF according to a disclosure of the present specification.

The UE 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method.

The P-CSCF 200 includes a processor 201, a memory 202, and a radio frequency RF unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

The processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module procedure, function, and the like to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for obtaining an identifier of a visited public land mobile network (V-PLMN) in order to register a user equipment (UE), which has roamed to the V-PLMN, to an IP multimedia subsystem (IMS) network, the method performed by a proxy-call session control function (P-CSCF) and comprising:

when a request message to register to the IMS network is received from the UE, transmitting, by the P-CSCF, the request message to an interrogating-CSCF (I-CSCF);

receiving, by the P-CSCF, a response message from the I-CSCF in response to the transmission of the request message;

when the received response message is a 401 unauthorized message, transmitting, by the P-CSCF, the response message to the UE;

when the received response message is the 401 unauthorized message, generating, by the P-CSCF, a reception (Rx) interface for transmitting and receiving data with respect to a policy and charging rule function (PCRF);

receiving, by the P-CSCF, the identifier of the V-PLMN from the PCRF through the Rx interface; and transmitting, by the P-CSCF, the identifier of the V-PLMN to the I-CSCF.

2. The method of claim 1, further comprising:

if a new request message to register to the IMS network is received from the UE, transmitting, by the P-CSCF, the new request message to the I-CSCF by adding the identifier of the V-PLMN to a header of the new request message.

3. The method of claim 1, wherein in the receiving of the identifier of the V-PLMN, a notification for a change in the identifier of the V-PLMN is subscribed for the PCRF through the Rx interface, and the identifier of the V-PLMN is received from the PCRF.

4. A method for obtaining an identifier of a visited public land mobile network (V-PLMN) in order to register a user equipment (UE), which has roamed to the V-PLMN, to an IP multimedia subsystem (IMS) network, the method performed by a proxy-call session control function (P-CSCF) and comprising:

when a request message to register to the IMS network is received from the UE, holding, by the P-CSCF, the request message and generating a temporary register message;

transmitting, by the P-CSCF, the generated temporary register message to an interrogating-CSCF (I-CSCF), and receiving a response message;

when the received response message is a message for allowing the registration to the IMS network, discarding, by the P-CSCF, the response message, and generating an interface for transmitting/receiving data with respect to an entity of an Evolved Packet Core (EPC) network; and receiving, by the P-CSCF, the identifier of the V-PLMN from the entity of the EPC through the interface.

5. The method of claim 4, further comprising:

transmitting, by the P-CSCF, the request message to the I-CSCF by adding the identifier of the V-PLMN to a header of the held request message.

6. The method of claim 4, wherein in the receiving of the identifier of the V-PLMN, a notification for a change in the identifier of the V-PLMN is subscribed for the entity of the EPC network through the interface, and the identifier of the V-PLMN is received from the entity of the EPC network.

7. The method of claim 4, wherein if the entity of the EPC network is a policy and charging rule function (PCRF), the interface is a reception (Rx) interface.

8. The method of claim 4, wherein the message for allowing the registration to the IMS network is any one of a 401 unauthorized message and a 200 OK message.

9. A proxy-call session control function (P-CSCF) for obtaining an identifier of a visited public land mobile network (V-PLMN) in order to register a user equipment (UE), which has roamed to the V-PLMN, to an IP multimedia subsystem (IMS) network, the P-CSCF comprising:
    a transceiver; and
    a processor controlling the transceiver, wherein the processor is configured to:
        when a request message to register to the IMS network is received from the UE, control the transceiver to transmit the request message to an interrogating-CSCF (I-CSCF);
        control the transceiver to receive a response message from the I-CSCF in response to the transmission of the request message;
        control the transceiver to transmit the response message to the UE, when the received response message is a 401 unauthorized message;
        generate a reception (Rx) interface for transmitting and receiving data with respect to a policy and charging rule function (PCRF), when the received response message is the 401 unauthorized message;
        control the transceiver to receive the identifier of the V-PLMN from the PCRF through the Rx interface; and
        control the transceiver to transmit the identifier of the V-PLMN to the I-CSCF.

10. The P-CSCF of claim 9, wherein if a new request message to register to the IMS network is received from the UE, the processor transmits the new request message to the I-CSCF by adding the identifier of the V-PLMN to a header of the new request message.

11. A proxy-call session control function (P-CSCF) for obtaining an identifier of a visited public land mobile network (V-PLMN) in order to register a user equipment (UE), which has roamed to the V-PLMN, to an IP multimedia subsystem (IMS) network, the P-CSCF comprising:
    a transceiver; and
    a processor controlling the transceiver, wherein the processor is configured to:
        when a request message to register to the IMS network is received from the UE, hold the request message and generate a temporary register message;
        control the transceiver to transmit the generated temporary register message to an interrogating-CSCF (I-CSCF), and receive a response message;
        control the transceiver to discard the response message, and generate an interface for transmitting/receiving data with respect to an entity of an Evolved Packet Core (EPC) network, when the received response message is a message for allowing the registration to the IMS network; and
        control the transceiver to receive the identifier of the V-PLMN from the entity of the EPC through the interface.

12. The P-CSCF of claim 11, wherein the processor transmits the request message to the I-CSCF by adding the identifier of the V-PLMN to a header of the held request message.

13. The P-CSCF of claim 11, wherein the message for allowing the registration to the IMS network is any one of a 401 unauthorized message and a 200 OK message.

* * * * *